Dec. 2, 1958     H. W. STIEGLER     2,862,383
METHOD AND APPARATUS FOR TESTING FABRICS
Filed Aug. 2, 1955
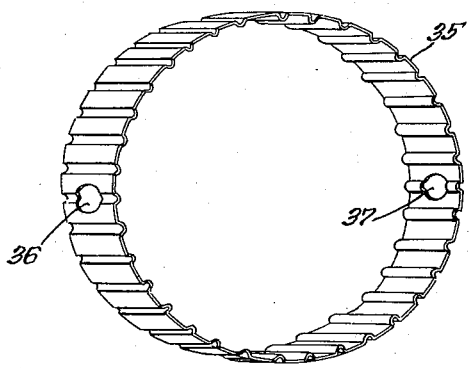
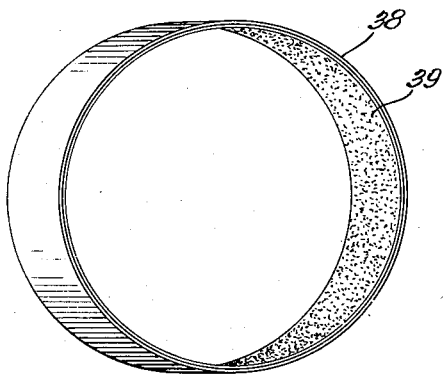
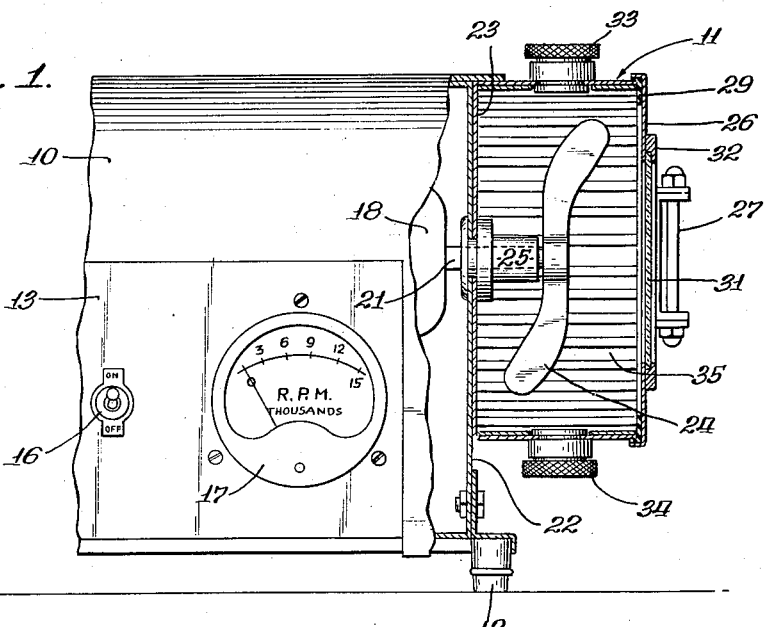
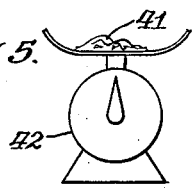
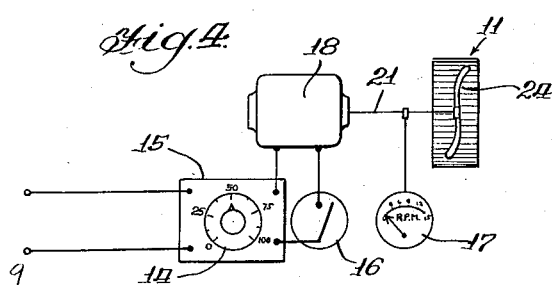
INVENTOR.
Harold W. Stiegler
BY
L. F. Hammand Atty.

United States Patent Office 2,862,383
Patented Dec. 2, 1958

2,862,383

METHOD AND APPARATUS FOR TESTING FABRICS

Harold W. Stiegler, Lowell, Mass., assignor to The American Association of Textile Chemists and Colorists, Lowell, Mass., a corporation of Massachusetts Application August 2, 1955, Serial No. 526,030

1 Claim. (Cl. 73—7)

This specification is a continuation-in-part of my copending application Serial Number 184,833 filed September 14, 1950, now Patent No. 2,749,740.

The invention relates to new and improved accelerated testing methods and apparatus for testing textiles and other flexible materials; the method being capable of results bearing an unusually high correlation to the effects of actual wear and laundering as to wear resistance, colorfastness, strength, weight loss, shrinkage, porosity, etc., and the apparatus being capable of practicing the method under laboratory conditions in an unusually short time interval.

The determination of the inherent characteristics of fabrics and other flexible materials under conditions encountered in actual use of the fabrics presents a serious problem; primarily because of the long time interval ordinarily required to observe the effects of ordinary usage. Also, manufacturers and sellers of garments have difficulty in following specific garments through the channels of trade to specific individual users or consumers. Even if they can identify such users, it is a matter of many months before the garment has been sufficiently worn or used to serve as any kind of guide as to the effect of the wear and use on the strength, weight, color, porosity, etc., of the garment. Furthermore, it is exceedingly difficult to determine from the consumer or user, the extent of the wear to which a given garment has been subjected with sufficient definiteness to be truly instructive to the manufacturer. Even if such a determination is accurately made, it is of little value unless made promptly, so that any defects discovered in a given run of material may be remedied while the material is still in process of manufacture and before it reaches the market.

From the foregoing, it can be appreciated that an accelerated laboratory method of testing of fabrics and other flexible materials, in a very short interval of time, is of extreme importance to the manufacture or seller of such goods. Yet to be of value, any such test must be accurate. That is, it must be of such nature that the results of accelerated test bear a true correlation to the results encountered in actual usage. Otherwise an accelerated test cannot be relied upon to give a true indication of the wearing qualities of the material in the end use for which it is intended.

Up to the present time, practically all synthetic methods of testing and evaluating wearing qualities of fabrics have involved rubbing, scraping, abrading, or applying surface friction to the fabric while it is firmly fixed or secured in such a manner that the test sample is not free to move about appreciably. It has long been known, however, that while such methods may give some very rough indication of the wearing qualities of the material tested, yet they do not accurately duplicate the effects of actual use upon the material or garments.

It follows that in the textile trade and in other trades using cloth, leather or other flexible fibrous materials, there has long been a recognized need of a new method and different means to determine, quickly but accurately, the inherent capacity of fabrics or other flexible materials to withstand ordinary wear and abrasion, and to accurately determine, from a small swatch or other sample of a given material, its ability to retain its color, strength, weight, porosity, etc.

It is, therefore, the primary object of the present invention to provide an accelerated dry testing method different than those heretofore used, together with novel apparatus for practicing the method, in order that testing of fabrics may be accomplished in an extremely short time, yet wherein an accurate determination of the characteristics of the material may be made.

A further object of the invention is to provide an apparatus in which fabrics or other flexible materials may be tested in a dry state, yet also of such design that materials may also be tested wet, either moist, dripping wet, submerged in water or in a soap solution, or in a solution of dyes, finishing materials, solvents, or other chemicals deemed helpful in determining the effects of repeated laundering, degree of permeability to dyes, or other characteristics.

Another object of the invention is to provide apparatus for making such tests on such materials which is simple in construction, economical to manufacture and maintain, is free of complicated parts which might easily get out of order, and is simple and easy to operate.

In accomplishing these objects, the present applicant has departed from the teachings of the prior art, which ordinarily have sought to duplicate, as closely as possible, the conditions encountered in actual use. In contrast to this, the present applicant has devised a testing method wherein the test sample is subject to conditions entirely different from those encountered in normal use, but which nevertheless have been found to result in a more accurate determination of the actual wear-resisting qualities of a given material than has heretofore been accomplished.

In ordinary usage, textile materials are subjected to the flexing and abrasive effects of ponderous forces applied to the material at comparatively low speeds, and in most cases these forces are applied to the material while it is held in such a manner that it is not free to move or shift about appreciably.

In the procedures here disclosed, the test samples are not secured nor restrained in any manner, but are knocked about in the air while entirely unsupported and unrestrained. In short, the samples under test are in a free floating condition in the air, and are simultaneously driven in a random path of movement such that they repeatedly impinge an abrasive coated surface on inside walls of a container in which the test is conducted. The sample swatches of fabric employed in the test are thus caused to follow a zig-zag course along a generally circular orbit, while at the same time being continuously subjected to violent internal flexing and to rapidly repeated light, high-velocity mechanical impacts. By this mode of treatment the test samples of the material are simultaneously subjected to external and internal wear and strain, which may involve the rubbing of fiber against fiber and thread against thread, as well as frictional contact and impact between the sample and the internal surfaces of the test apparatus. These procedures produce effects bearing a much better correlation to the effects of actual use than is practicable with test samples which are abraded when so firmly fixed that they are not free to move about.

In the preferred form of the invention, the test samples are treated in the manner indicated above by an apparatus best described in connection with the drawings of this specification, wherein:

Figure 1 is a fragmental side elevational view of a preferred form of the apparatus contemplated by the present invention, the view being partly in section and showing the internal construction of the test chamber;

Figure 2 is a perspective view of a corrugated metal liner designed to be inserted in the test chamber of the device;

Figure 3 is a perspective view of an abrasive coated liner;

Figure 4 is a schematic diagrammatic view of the several mechanical components of the apparatus, and Figure 5 is a diagrammatic illustration of a standard scale forming a cooperating part of the apparatus and utilized in the practice of the method here disclosed.

As illustrated in the drawings, the machine comprises an exterior housing 10 which serves to enclose the motor and transformer of the apparatus, as well as to provide a convenient mount for the test chamber 11. The machine is preferably provided with a plurality of feet 12. The housing 10 includes a control panel 13 upon which are mounted the control knob 14 of a variable voltage transformer 15, a timing control switch 16 of either manual or automatic type, and an electric tachometer 17. The housing 10 also encloses an electric motor 18 connected to the transformer switch and tachometer as diagrammatically illustrated in Figure 4.

The armature shaft 21 of the motor 18 projects through the end plate 22 of the housing 10 and through the rear wall 23 of the test chamber 11. A sealed bearing 25 supports the outer end of this shaft, and an impeller paddle 23 is mounted on the shaft for rotation within the chamber. If desired, the opposite ends of the impeller may be oppositely offset from each other, as best seen in Figure 1.

The outer end of the test chamber 11 is sealed by a door 26. Conveniently, this door may be hinged to the chamber by a hinge 27 and provided with a clamping latch 28 and an annular gasket 29 so that a water tight seal may be effected if desired. The front wall 26 of the chamber may also be provided with a central transparent window 31, mounted in an annular frame 32 to permit observation of the material under test while the test is in progress. The test chamber is also preferably provided with a filler plug 33 at the top of the container and a similar drain plug 34 at the bottom.

The outer cylindrical wall of the chamber 11 is arranged to receive removable lining sleeves, which may be of the types illustrated in Figures 2 or 3. For wet testing, it is preferable to provide a corrugated collar 35 with apertures 36 and 37 in registry with the filler plug and drain. For dry testing, a plain sheet metal sleeve 38 with an abrasive liner 39 is preferable. For best results, this abrasive liner comprises a sheet of emery cloth having multiple layers of abrasive grit on its inner surface. The outer surface of the cloth may be adhesively secured to the metal sleeve 38.

For best results, that is, to obtain the most accurate correlation with the effects of actual usage, samples of material to be tested should be carefully prepared by cutting a small square swatch of the fabric, fraying each edge of the specimen about ⅛ inch, and applying a thin ribbon of a free flowing adhesive to the frayed area, and working the adhesive in firmly and uniformly with a small stiff brush. Each test specimen should be allowed to dry in air at room temperature for at least 5 minutes before testing, to insure that all the solvent of the adhesive has evaporated.

Each specimen should be carefully weighed, before and after testing, to determine weight loss. The weighing should preferably be done under standard conditions, as by placing the specimen 41 on any conventional scale as indicated at 42. Specimens are always weighed with the adhesive on them since the adhesive does not wear off to a significant extent in short runs of 4 or 5 minutes.

For dry testing, the operator should slightly crumple the specimen by hand, place it in the chamber 11, and close the door 26. The speed control knob 14 of the variable voltage transformer should be set at a medium position as the motor is started, and then adjusted quickly to bring the motor to any desired speed between zero and 15,000 R. P. M. Constant adjustments may be made if necessary, to maintain the exact speed and the test should be run for the exact time desired. The timing may be by stop watch, or by automatic electric timing devices of the control switch 16.

In addition to evaluation of the effects of the test by weight loss, visual observation of light transmission through worn areas, air permeability, sensory notation of "hand" or "worn feeling," softness, thinness, etc., may be made. Also, detritus may be collected for microscopic examination.

Much valuable information may also be obtained by a special test designed to indicate wear of the edges of cuffs, coat sleeves, collars, hems, seams, etc., and by observing such types of wear on various fabric constructions and fiber contents. For this test, the prepared specimens are first folded from two opposite corners to form a triangle. (Note: Back or face abrasion may be observed by forming the triangle with the desired surface on the outside, e. g., differences in wear between the sateen face and the back of Army 9 oz. sateen are readily observed.) The samples are then stitched with coarse cotton thread about ¼" from the folded edge. The other two sides of the triangle are also stitched. Adhesive is applied to the frayed edges, and the samples are tested as heretofore described.

Evaluation of the results of this test may be made by opening the triangle and observing the "edge" wear along the fold by holding to light. Differences in wear due to variations in finishes, treatments such as shrink-proofing of wool, etc., may be evaluated visually. An alternative evaluation can be practiced by measuring the time required for different specimens to reach an equal degree of degradation under identical test conditions.

In wet test procedure, a sample prepared as indicated above may be placed in the test chamber and an appropriate amount of water, solvent or other liquid introduced through the filler plug before the motor is started.

From the foregoing it will be apparent that the present invention provides a novel method of conducting accelerated tests of fabrics, etc., as well as providing a new and unique piece of equipment by which these tests may be accomplished. Of particular importance is the fact that tests conducted in the manner here disclosed provide a remarkably high degree of correlation with the results of normal garment wear, notwithstanding that the tests may be conducted with a small sample of the material and completed in a fraction of the time required to evaluate the results of normal wear.

Having thus described my invention, what I claim as new and desire to protect by United States Letters Patent is:

Apparatus for testing the dry wear resistance qualities of fabrics or other flexible materials comprising, in combination, a small, closed, cylindrical test container, with a removable lining sleeve of size and shape generally corresponding to the cylindrical walls of said container and adapted to be removably inserted therein, and an abrasive coating of emery cloth on the internal surfaces of said sleeve; means including an electric motor for driving a sample of material within said container and sleeve in a random, zig-zag path of movement along a generally circular orbit while causing it to repeatedly impinge the abrasive emery cloth coating within the sleeve and to be abraded by said coating and carom therefrom as it progresses.

References Cited in the file of this patent

UNITED STATES PATENTS

| | | |
|---|---|---|
| 674,101 | Stone | May 14, 1901 |
| 1,170,103 | Regnier | Feb. 1, 1916 |

(Other references on following page)

UNITED STATES PATENTS

| | | |
|---|---|---|
| 1,190,516 | Clark | July 11, 1916 |
| 1,627,248 | Owens | May 3, 1927 |
| 1,866,537 | Lambourn | July 12, 1932 |
| 2,585,657 | Keefer | Feb. 12, 1952 |
| 2,734,375 | Galbraith | Feb. 14, 1956 |
| 2,749,740 | Stieger | June 12, 1956 |

FOREIGN PATENTS

| | | |
|---|---|---|
| 1,037,912 | France | Sept. 23, 1953 |

OTHER REFERENCES

Research Paper, R. P. 753, National B. of Standards, Journal of Research of N. B. S., vol. 14, January 1935.

The Physical Properties of Sole Leather, part I, A Comparison of Machines for Testing Resistance to Abrasion, by Lloyd et al., Journal of International Society of Leather Trades, September 1939, pages 461–480 (page 464 relied upon).